United States Patent [19]

Eley

[11] Patent Number: 4,631,973
[45] Date of Patent: Dec. 30, 1986

[54] AXIAL RETENTION OF GEAR ON SHAFT

[75] Inventor: James M. Eley, Corinth, Miss.

[73] Assignee: Dana Corporation, Toledo, Ohio

[21] Appl. No.: 473,480

[22] Filed: Mar. 9, 1983

[51] Int. Cl.$^4$ ............................ B23P 11/02; F16B 4/00
[52] U.S. Cl. .......................................... 74/439; 29/447;
   403/273; 403/375; 418/206
[58] Field of Search ...................... 74/421 R, 434, 439;
   29/447; 403/273, 375, 360, 345; 418/206, 270

[56] References Cited

U.S. PATENT DOCUMENTS

| | | | |
|---|---|---|---|
| 228,842 | 6/1880 | Totten | 29/129.5 |
| 689,455 | 12/1901 | Bickford | 29/447 |
| 746,440 | 12/1903 | Austin | 285/381 |
| 1,081,257 | 12/1913 | Sprado | 22/48 |
| 1,687,343 | 9/1940 | Wadden | 285/381 |
| 1,693,838 | 12/1928 | Faudi | 29/447 |
| 1,743,514 | 1/1930 | Alley | 105/34 |
| 2,198,689 | 4/1940 | Wills | 92/238 |
| 2,215,424 | 9/1940 | Klein | 80/58 |
| 2,245,608 | 6/1941 | Rogers | 29/447 |
| 3,133,452 | 5/1964 | Coutant et al. | 74/421 R |
| 3,159,402 | 12/1964 | Nichols | 29/447 |
| 3,167,967 | 2/1965 | Silberger | 74/421 R X |
| 3,263,425 | 8/1966 | Rhode | 418/206 X |
| 3,269,327 | 8/1966 | Norlin | 418/206 X |
| 3,725,994 | 4/1973 | Wechsler | 29/447 |
| 4,121,331 | 10/1978 | Fukuma et al. | 29/447 |
| 4,256,348 | 3/1981 | Lester et al. | 29/447 X |
| 4,462,148 | 7/1984 | Joyce | 29/447 |

FOREIGN PATENT DOCUMENTS

| | | | |
|---|---|---|---|
| 717724 | 9/1965 | Canada | 403/273 |
| 55-125948 | 9/1980 | Japan | 29/447 |
| 382058 | 10/1932 | United Kingdom | 29/DIG. 035 |
| 936499 | 9/1963 | United Kingdom | 29/447 |
| 502133 | 4/1976 | U.S.S.R. | 403/273 |

Primary Examiner—Lawrence J. Staab
Attorney, Agent, or Firm—F. B. McDonald

[57] ABSTRACT

A gear is retained on a shaft over a reduced diameter portion of the shaft intermediate the ends thereof. An axially extending bore through the gear is received by the reduced diameter portion of the shaft, the portions of the shaft positioned outboardwardly of the gear defining axially opposed integral retention walls for axially fixing the gear on the reduced diameter portion.

7 Claims, 3 Drawing Figures

AXIAL RETENTION OF GEAR ON SHAFT

BACKGROUND OF THE INVENTION

This invention relates to securement of gear members on shaft members in installations such as gear pumps and similar applications involving extreme loads. More particularly, the invention relates to the axial retention or securement of gears on shafts which flex cyclically under vibration and shock loading or other unusually severe operating conditions.

As well appreciated by those skilled in this art, any significant cutting or removal of metal in gear or shaft members increases the likelihood of fatigue failure of the affected member. For this reason, a common method of joining gear and shaft members includes shrink-fitting the gear to the shaft. The latter involves making the internal diameter of the gear slightly smaller than the shaft diameter, and heating the gear to several hundred degrees Fahrenheit. Simultaneously, the shaft is cooled and placed within the bore of the gear. As the temperatures begin to equalize, the swelling of the shaft and the shrinking of the gear will result in the joining of the members wherein the contact zone between shaft and gear will be subject to constant compressive forces.

This particular means has been satisfactory for insuring the radial securement of a gear to a shaft in relatively standard loading environments wherein the significant forces only attempt to force the gear member to rotate relative to the shaft member. However, in gear pump and other environments subjected to severe radial loading, cyclic flexure of the rotating shaft will cause the bore of the gear to bellmouth. The latter phenomenon will often result in axial displacement of the gear along the shaft, causing failure of the gear pump and/or other apparatus.

Notwithstanding the increased likelihood of fatigue failure, conventional means of axial securement of gears on shafts for avoiding the latter displacement under extreme loading have involved keys, pins, snap rings, and other axial holding mechanisms which require localized cutting. The result has been short fatigue life expectancies of gear-shaft systems employed in severe loading environments.

SUMMARY OF THE INVENTION

The invention disclosed herein enhances the axial securement of a gear on a shaft, while promoting longer fatigue life of the gear-shaft system. The invention incorporates a shaft having a concentrically reduced diameter portion positioned intermediately of the shaft ends. A gear is fixedly positioned over the reduced portion. As the outboard ends of the shaft have a greater diameter, the inner extremities thereof present opposed annular retention walls which operate to fixedly position the gear therebetween over the reduced diameter portion of the shaft. In a preferred embodiment, the gear is also shrink-fitted onto the shaft for enhanced radial and torsional securement. A preferred radial reduction of the intermediate portion is one thousandth of an inch for each inch of outboard end shaft diameter.

DETAILED DESCRIPTION OF A PREFERRED EMBODIMENT

Figure 1:
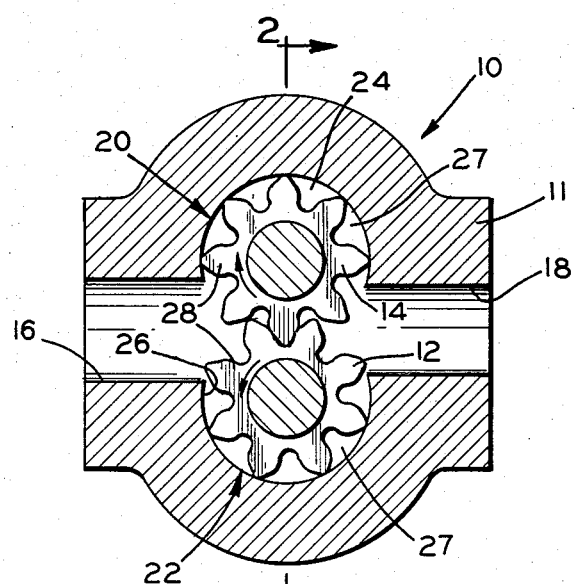
FIG. 1 is a fragmentary, sectional elevational view of a gear pump incorporating two interacting gear-shaft assemblies manufactured in accordance with this invention.

A gear pump 10, shown in FIG. 1, includes drive and driven gears 12 and 14, respectively. The gears 12 and 14 are in constant mesh, and rotate as indicted by arrows to transfer fluid from a suction port 16 to a discharge port 18. The gears 12 and 14 rotate within a housing 11 in internal bores 20 and 22, respectively, conveying the fluid within moving pockets 24 defined by walls 26 of the bores 20,22 and interstices 27 of gear teeth 28.

Figure 2:
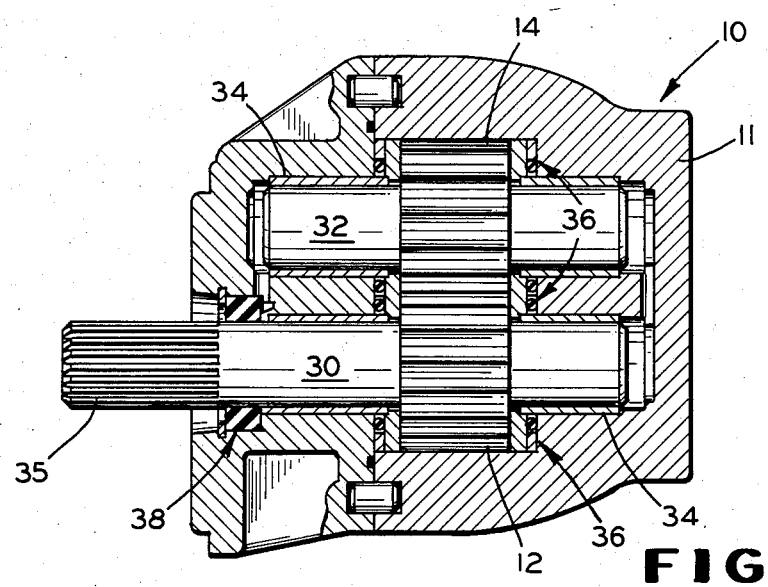
FIG. 2 is a sectional elevational view of the same gear pump along lines 2—2 of FIG. 1.

Referring to FIG. 2, the drive and driven gears 12 and 14 are fixedly mounted on drive and driven shafts 30 and 32, respectively, each shaft being rotatably supported in conventional journal bearings 34. As apparent, the drive shaft 30 contains a splined end 35 (which may contain keys, or other coupling mechanisms, not shown) for connection with a prime mover.

A set of pressure plates 36 are urged against the sides of the gears 12 and 14 by fluid pressure ported axially inwardly thereagainst, as will be appreciated by those skilled in the art. The plates 36, together with the bore walls 26 and interstices 27 of the gear teeth 28 define the boundaries of the aforementioned moving pockets 24 which convey fluid. Seals 38 prevent leakage of the splined end 35 of the drive shaft 30; all other shaft ends are internally contained within the housing 11 of the gear pump 10.

Figure 3:
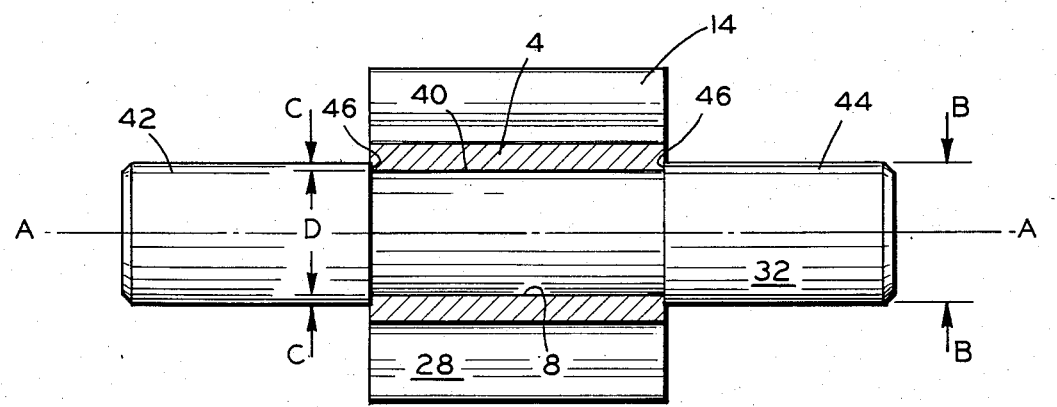
FIG. 3 is an enlarged side view of the upper of the two gear-shaft assemblies shown in FIG. 2.

FIG. 3 is an enlarged view of the driven shaft 32 as employed in the gear pump 10 of FIGS. 1 and 2. As mentioned, the shaft 32 contains a driven gear 14 fixedly mounted thereon. The driven gear 14 includes a hub portion 4 having a bore 8 therethrough, and a plurality of teeth 28 extending radially therefrom.

The general art of fixing a gear to a shaft involves distinct procedures for insuring securement in both radial and axial dimensions. Thus, common radial procedures insure that the gear does not rotate about the shaft under torsional loads, while axial securement techniques prevent the gear from shifting axially along the shaft. This invention, directed to the latter, provides an improved axial securement structure which is novel to gear-shaft art.

As stated earlier, under severe loading, the gear can, notwithstanding a satisfactory securement thereof to a shaft, shift axially out of position on the shaft. Thus referring again to FIG. 3, a reduced diameter portion 40 of the shaft 32 lies intermediate outboard portions 42 and 44 of the shaft. As apparent, the hub 4 is secured to the shaft over the reduced diameter portion 40, preferably though not necessarily by a shrink-fitting technique herein-below described. The reduced portion 40 of the shaft 32 is preferably concentric with the outboard portions 42,44, thereof, and thus the respective shaft portions all share a common axis "A—A". The portion 40 thus defines a section of the shaft intermediate the outboard portions 42,44, wherein there is a reduction in the radius thereof, hereinafter referred to as a radial reduction "C" (FIG. 3).

The resulting intermediate portion 40 is only slightly smaller than the outboard end portions 42,44, of which the latter in the preferred embodiment are equal in size (though they need not be). For shaft sizes wherein the outboard ends 42,44 have a diameter "B" in the range of one to three inches, a radial reduction "C" of an amount equal to one thousandth of an inch per inch of outboard end diameter will provide a successful securement of gear to shaft in a gear pump environment. The radial reduction "C" is preferably achieved by a machining step, although other means such as forging may be amenable therefor.

Thus in accordance with the present invention, it will be noted that given a one inch diameter "B" of the outboard shaft ends 42,44, the opposing integral annular retention walls 46 (formed by the difference in relative diameters between the outboard portions 42,44 and reduced diameter portion 40 of the shaft 32), will have a radial extent only one thousandth of an inch. Notwithstanding their relatively small size, the walls 46 will provide a sufficient axial securement of the gear on the shaft in the typical gear pump environment. It will also be noted that where the amount of radial reduction "C" equals one thousandth of an inch, the diameter "D" of the reduced portion 40 equals B minus 2C. Thus, in this example, the diameter of the reduced portion 40 will actually be two thousandths less than "B", the one-inch diameter of the outboard ends 42,44.

The opposing annular retention walls 46 thus have a radial dimension more easily felt by a finger than seen by an eye, particularly on a shaft wherein the surfaces of the intermediate and outboard portions have equal surface treatments; for example, where both are highly polished or both are roughly ground. Yet, the reduced diameter portion 40 when formed by a machining step provides a relatively inexpensive axial securement mechanism whereby the annular retention walls 46 are sufficient to axially and permanently fix the gear 14 on the shaft 32.

A preferred radial securement of the gear to the shaft involves using shaft members in which the outside diameters thereof are oversized relative to the bore diameter of the gear, for example, preferably by thirteen to twenty-three ten thousandths of an inch for a one-inch diameter shaft. The members are preferably of high strength steel materials, or other metallic compositions of high carbon content. The gear 14 is heated to several hundred degrees Fahrenheit, preferably in the range of 450-500, resulting in its expansion. Simultaneously, the shaft 32 is cooled to 300-350 degrees below zero Fahrenheit. The shaft is then placed into position within the bore 8, and the temperatures of the members are allowed to equalize, resulting in swelling of the shaft and shrinking of the gear. Upon completion of the process, a strong mechanical joint is formed via residual compressive forces, providing a torsionally secure fixation of gear to shaft.

Although the gear securement structure as described herein has been limited to the driven gear 14 and the driven shaft 32, it will be apparent to those skilled in the art that the same mechanics and description will apply equally to the securement of the drive gear 12 on the drive shaft 30.

Finally, as also described herein, the gear and shaft members are preferably of metallic materials, particularly where the gear is to be shrink-fitted over the shaft. However, where non-metallic materials can be expanded by application of heat without melting, and/or contracted by removal of heat without becoming brittle and cracking, it is conceivable that such alternative materials may also be employed under this invention.

What is claimed is:

1. In an article of manufacture comprising a shaft and a gear fixed to the shaft, said gear having an axially extending bore therethrough wherein said shaft extends through said bore along a common axis; an improvement comprising: said shaft including a reduced diameter portion intermediate the ends of said shaft, wherein portions of said shaft positioned outboardwardly of said gear define axially opposed integral retention walls disposed orthogonally to said axis and juxtaposed against the sides of said gear for fixing said gear over said reduced diameter portion of said shaft.

2. The article of claim 1 wherein said reduced diameter portion of said shaft is concentric with said outboard portions of said shaft.

3. The article of claim 2 wherein said reduced portion of said shaft has a radial reduction of approximately one thousandth of an inch per each inch of the diameter of said outboard portions of said shaft.

4. The article of claim 3 wherein said axially opposed integral retention walls define annular surfaces for axially fixing said gear over said reduced diameter portion of said shaft.

5. The article of claim 4 wherein said gear and said shaft comprise metallic materials.

6. The article of claim 5 wherein said gear is shrink-fitted over said reduced portion of said shaft.

7. An article of manufacture comprising a shaft and a gear fixed thereto on a common axis, said gear having an axially extending bore therethrough, said shaft including a reduced diameter portion intermediate the ends of said shaft wherein said bore of said gear is fixed to said reduced diameter portion, and wherein portions of said shaft positioned outboardwardly of said gear define axially opposed integral retention walls disposed orthogonally to said axis and juxtaposed against the sides of said gear for axially fixing said gear over said reduced diameter portion of said shaft.

* * * * *